United States Patent Office 3,267,448
Patented August 16, 1966

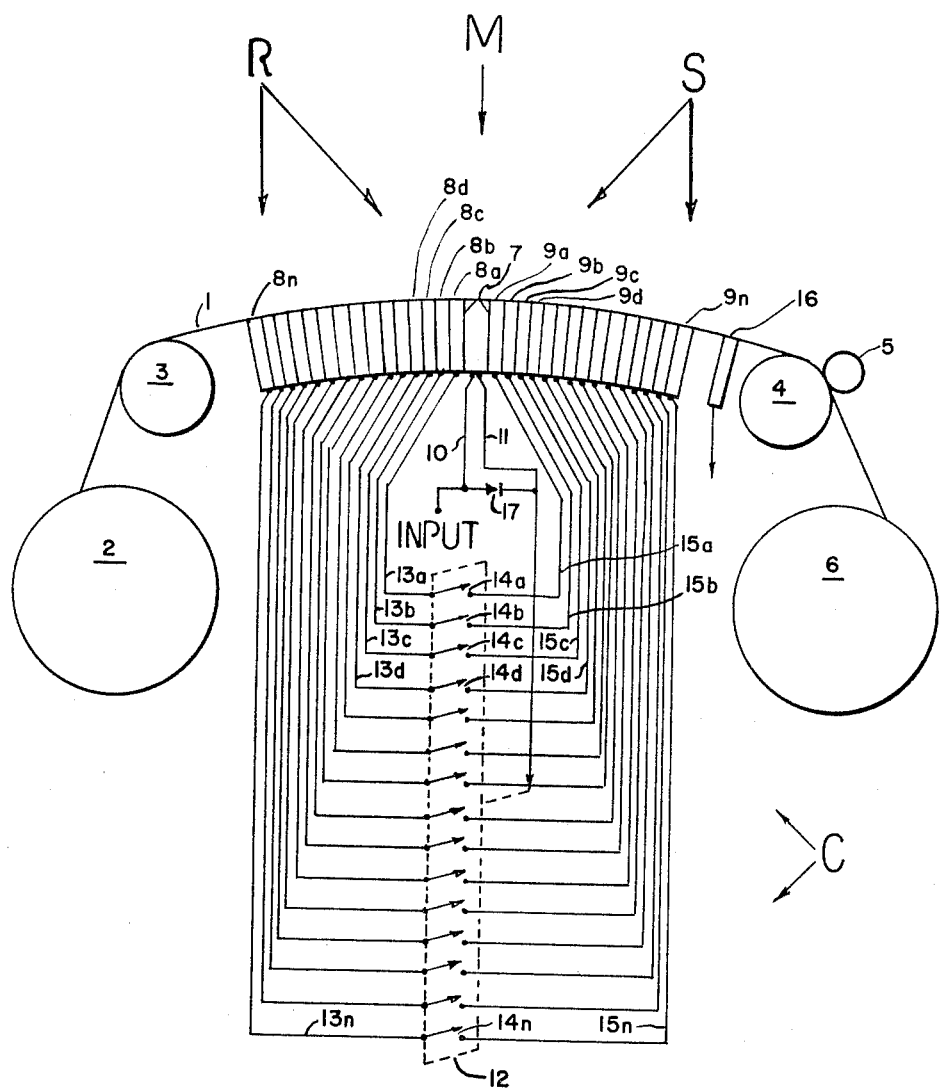

3,267,448
PULSE SERIES EXTENDERS
Roland Eric Gunther, 100 Joanne St.,
Princeton Junction, N.J.
Filed Sept. 11, 1962, Ser. No. 222,888
1 Claim. (Cl. 340—174.1)

Because of the variety of natural interferences that may attenuate radio signals, the use of signal amplitude as a conveyor of information is less desirable than some form of pulse characterization. The time interval between pulses is conveniently establishable and recognizable. In cases in which the time-pulsed information is given in nonrepetitive form, as when relating to transient or rapidly varying situations, any such pulse message must of necessity be in the nature of a short burst of pulses, and the shorter the series, the more uniformity can be expected.

Analysis of pulse series may very conveniently be made by the use of vibrating reed frequency meters; these instruments do however set one demand, namely that the pulse series be sufficiently sustained until one reed definitely goes into resonance with the input signal. Before this condition is established, some of the other reeds may be observed to be in motion, not of course to the degree of amplitude attained by the proper one when finally in resonance. The number of pulses of a given frequency needed for resolution and readout varies somewhat with the frequency involved, the strength of the pulses, and the construction of the meter. In general, it may take from six to 15 pulses to establish resonance. A longer series of pulses than this is desirable from the viewpoint of the observer, for even after resonance is established, a reasonable time should be allowed for careful and accurate readout.

The availability of an extended pulse series has the further advantage that the amplitude of resonance in the vibrating reed frequency meter can be driven far enough to make a reed reach a contact, thereby making it possible to record the action.

It is an object of this invention to provide a means whereby any fairly uniform time-based series of pulses can be extended to any desired length.

The construction and the mode of operation of the device which is the object of this invention are shown in the accompanying drawing and described in the following specification.

Referring first to the drawing, it shows the device to consist of the principal parts of a conventional magnetic tape recording system with such additional features as that of the main head M being of the two track type, with a closely spaced bank of recording heads R flanking the main head on the left side, and a similarly constructed closely spaced bank of sensing heads flanking the main head on the opposite side, plus switchable connections between opposing individual recording and sensing heads grouped in a network C with the switching functions simultaneously controllable by the input to the device or alternately by the output from the main head.

Taken in more detail the drawing shows a magnetic recording tape 1, a supply spool 2, from which said tape runs over an idler roller 3, thence over a bank of closely spaced recording heads 8a, 8b, 8c, 8d, . . . 8n, thence over a main two track half recording, half sensing head 7, thence over another bank of closely spaced bank of heads physically the same as the said recording heads but carrying the function of sensing heads 9a, 9b, 9c, 9d, . . . 9n. A tape take-up reel is shown by the number 6, and the transport of the tape is effected in conventional manner by a drive capstain 5 in conjunction with a contact roller 5. Shown between the last sensing head 9n and the contact roller 5 is a readout head 16.

The recording head 8a nearest the main head 7 is connectable to the sensing head 9a nearest the main head by means of a conductor 13a, one pole 14a of a multiple position switch 12 and another conductor 15a. Each succeeding recording head 8b, 8c, 8d, . . . 8n away from the main head is connectable to its opposite sensing head 9b, 9c, 9d, . . . 9n by similar conductors 13b, 13c, 13d, . . . 13n, succeeding poles 14b, 14c, 14d, . . . 14n on switch 12 and further conductors 15b, 15c, 15d, . . . 15n.

The main head 7 as mentioned is of the two track type, and an input lead 10 is indicated, by means of which the recording half of this head can receive external signals and impress them on tape 1. An output lead 11 is also shown; this output is connected to the control of the multiple pole switch 12. A connection 17 between the input and lead 11 in the form of a one way path making the switch 12 also controllable by the input to the device.

For the purposes of this invention all recording heads as well as all sensing heads are constructed as thin as possible, placed as closely together as possible, and corresponding pairs of sensing and recording heads located equidistant from the center of the main head with a high degree of accuracy.

The device operates as follows. The first pulse of an impressed series of pulses, coming into the input, puts a marker on the tape. It also causes the coincidence switch 12 to close momentarily but at the moment this has no importance. The tape moves on and the first marker is opposite one of the sensing heads when the second pulse arrives at the input. This pulse also puts a marker on the tape and also actuates the coincidence switch. The closing of the switch permits the sensing head that senses the first marker to impress a back marker on the tape by means of its corresponding recording head. The distance between the first marker and the second marker on the tape is equal to the distance between the back marker and the second marker.

Conditions for extension of the pulse series are now given. As soon as the back marker arrives at the main head it can take over the function of the input pulses, should these cease to arrive. As long as they do arrive they will coincide with the last created back markers. In either case the pulse series can be allowetd to generate on the tape for as long as is desired.

The drawing shows a readout head 16. Readout need not take place in the same device that is used for extending the pulse series as described; it can be carried out at any convenient time by running the tape through a playback unit. In many cases it will be convenient and desirable to effect readout immediately. Connecting the output of the readout head to a vibrating reed frequency meter will permit this to be done forthwith. It is even advantageous to do this since unnecessary extension of the pulse series can thereby be avoided by switching to another input as soon as the extended series has been stretched out enough for a reading to have been made.

I claim:

In a device for extending series of electrical pulses of fairly uniform character, a magnetic recording means, an input, a two function recording and sensing main head, a coincidence switching means, said switching means operable by electrical signals appearing either at said input or at said sensing portion of said main head, a bank of closely spaced recording heads closely flanking and ahead of said main head, a bank of closely spaced sensing heads flanking and after said main head, said banks of recording and sensing heads providing pairs each of one recording and one sensing head equidistant from said main head, all of said pairs of recording and sensing heads connectable within said pairs at the same time by means of said coincidence switching means, and said input also connected to said recording portion of said main head.

No references cited.

BERNARD KONICK, *Primary Examiner.*

JAMES W. MOFFITT, *Examiner.*

V. P. CANNEY, *Assistant Examiner.*